(12) United States Patent
Sherman (10) Patent No.: US 6,602,054 B1
(45) Date of Patent: Aug. 5, 2003

(54) FLUID MOTOR APPARATUS FOR AMPLIFYING THRUST

(76) Inventor: Norman Sherman, 17 S. Meadows, Woodbury, CT (US) 06798

( * ) Notice: Subject to any disclaimer, the term of this patent is extended or adjusted under 35 U.S.C. 154(b) by 18 days.

(21) Appl. No.: 09/682,704

(22) Filed: Oct. 8, 2001

(51) Int. Cl.$^7$ ................................................ B64C 11/46
(52) U.S. Cl. ........................ 416/99; 416/128; 416/198 A
(58) Field of Search ......................... 416/99, 175, 203, 416/189, 191, 128, 129, 198 R, 198 A, 236 R, 236 A (56) References Cited

U.S. PATENT DOCUMENTS

| | | |
|---|---|---|
| 1,787,321 A | 12/1930 | Orr |
| 3,247,906 A | * 4/1966 | Tappan .................... 416/99 |
| 3,298,636 A | 1/1967 | Arnholdt |
| 3,389,879 A | 6/1968 | Grebe |
| 4,840,540 A | 6/1989 | Kallergis |
| 6,138,954 A | 10/2000 | Gaunt |

FOREIGN PATENT DOCUMENTS

GB 460513 1/1937

* cited by examiner

Primary Examiner—Edward K. Look
Assistant Examiner—Dwayne J. White
(74) Attorney, Agent, or Firm—William C. Crutcher (57) ABSTRACT

An array of axially spaced rotating airfoils having funnel strips on the blades to increase the lift to drag ratio and generate thrust are rotatably driven by small motors with rotating airfoils, also having funnel strips to enhance thrust. The small motors are mounted on the tips of one set of rotating airfoils, or on an auxiliary drive member, so as to provide rotational torque for the array, thereby amplifying thrust generated by the fluid motor.

21 Claims, 7 Drawing Sheets

FLUID MOTOR APPARATUS FOR AMPLIFYING THRUST

BACKGROUND OF INVENTION

This invention relates to the field of fluid motors having fluid impellers for generating either thrust or rotational power. More particularly the invention relates to fluid motors in which one or more fluid motors provide the propulsive mechanism for one or more other fluid motors, so as to provide an amplified output.

Patent application Ser. No. 09/682,455 was filed Sep. 5, 2001 and issued as U.S. Pat. No. 6,457,671 on Oct. 1, 2002 in the name of the present applicant for a funneled rotary foil (FRF), which patent is incorporated herein by reference. The funneled rotary foil in the aforementioned patent application added a funnel strip to the blade of a rotating airfoil to scoop in and increase the velocity of air flowing over the suction side of the air foil, and added fins to the blade tips to block radial flow from the blade tips.

More specifically, the invention of Ser. No. 09/682,455 claimed a funneled rotary foil comprising a rotatably mounted hub having an axis of rotation, a plurality of circumferentially spaced blades mounted on the hub so as to extend in a generally radial direction from the hub to a blade tip so as to be rotatable in a plane of rotation about the axis, each blade having a cross-section defining an airfoil with a suction side, a leading edge, a trailing edge, and defining a chord extending therebetween, the airfoil increasing gradually in thickness from the leading edge to a point of maximum thickness and thereafter decreasing in thickness, a fin attached to the blade tip and adapted to block radial flow from the blade tip, and a funnel strip mounted on each of the blades uniformly spaced from the suction side thereof and extending in a generally radial direction along the full length of the blade, the funnel strip having an inlet edge defining a funnel inlet area with the airfoil leading edge and having an outlet edge spaced from the suction side at approximately the point of maximum thickness to define a funnel outlet area, the funnel plate being oriented with respect to the chord so as to scoop in and increase the velocity of air flowing over the suction side of the airfoil, and dimensioned such that the ratio of inlet area to outlet area lies between and including the range of 2:1 to 20:1. Funnel angles are specified according to whether the funneled rotary foil is functioning as a wind-driving device or as a wind-driven device.

The funneled rotary foil is a highly efficient propeller-like device capable of producing a lift to drag (L/D) ratio of 100 to 1. However, a conventional propeller is also useful in the present invention and the term impeller herein includes either a conventional propeller or a funneled rotary foil (FRF).

The laws of aerodynamics applying to aircraft wings also apply to rotary airfoils. The conventional formulas utilize the terminology appropriate to the aerodynamic forces on an aircraft wing, as follows:

Lift=$C\rho/2V^2S$ and

Drag=$C_D\rho/2V^2S$ where $C_L$ is the coefficient of lift, $C_D$ is the coefficient of drag, $\rho$ is air density, V is the air velocity, and S is the wing area. A line from the leading edge to the trailing edge of the airfoil is the chord of the airfoil, and an angle $\alpha$ between the chord and the direction of airflow relative to the airfoil is termed the angle of attack. $C_L$ depends mainly on the angle of attack. $C_L$ values range from negative to about 4.5, but are usually from 0.3 to 1.5. Conventional wings stall (lose lift) above an $\alpha$ of about 15°. $C_D$ usually ranges from 0.004 to 20, and is composed of frictional drag due to air passing over the surface of the airfoil plus other drag forces produced by separation of airflow at the top of a wing at high angles of attack and air circulating lengthwise over the wing.

It is evident that lift and drag differ only in the coefficients $C_L$ and $C_D$ in the above formulas. The coefficient of drag, $C_D$ at medium speeds (below 0.8 of the speed of sound) is due mainly to frictional drag, which increases as velocity squared.

The coefficient of lift, $C_L$, increases linearly; therefore, the lower the angle of attack $\alpha$ the larger will be the L/D. The highest efficiency of a rotary airfoil when the airfoil is rotated by an energy source depends on attaining the highest lift to drag ratio possible.

While a funneled rotary foil or a propeller is useful as an impeller to produce thrust, it would be desirable to provide an improved fluid motor, which amplifies this thrust for the propulsion of trucks, planes, tanks, rockets, boats, and machinery. It would also be desirable to provide an improved fluid motor, which amplifies this thrust for powering rotating machinery such as electric generators, pumps, compressors, and similar equipment.

SUMMARY OF INVENTION

Briefly stated, the invention comprises a fluid motor having a primary fluid motor constructed to be rotated by secondary fluid motors so as to amplify and reorient the thrust created by the secondary fluid motors to achieve a high coefficient of performance. The fluid motors preferably have impellers constructed as funneled rotary foils, but the impellers could also be conventional propellers or contracted as a rotary funneled disc as explained later.

The invention may be summarized as a fluid motor comprising a primary fluid motor having at least one primary rotating fluid impeller arranged to generate thrust along a primary axis, a plurality of secondary fluid motors each having at least one secondary rotating fluid impeller arranged to generate thrust along a secondary axis, and secondary drive means adapted to cause the secondary fluid impellers to rotate, the secondary fluid motors being disposed on the primary fluid motor with their respective secondary axes directed with respect to the primary axis to cause the primary fluid impeller to rotate about the primary axis, whereby thrust along the primary axis is generated by the secondary drive means.

In the preferred form of the invention the primary and secondary impellers are constructed as funneled rotary foils in accordance with the aforementioned Ser. No. 09/682,455, and the primary fluid motor includes a plurality of primary fluid impellers.

BRIEF DESCRIPTION OF DRAWINGS

The invention will be better understood by reference to the following description, taken in connection with the accompanying drawing, in which.

DETAILED DESCRIPTION

Figure 1:
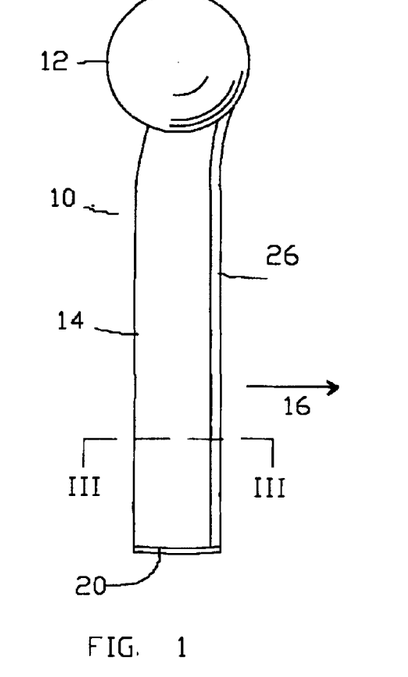
FIG. 1 is a front elevational view of a funneled rotary foil designed to function as a propeller, only one blade of the airfoil being illustrated, in accordance with pending application Ser. No. 09/682,455.
Figure 2:
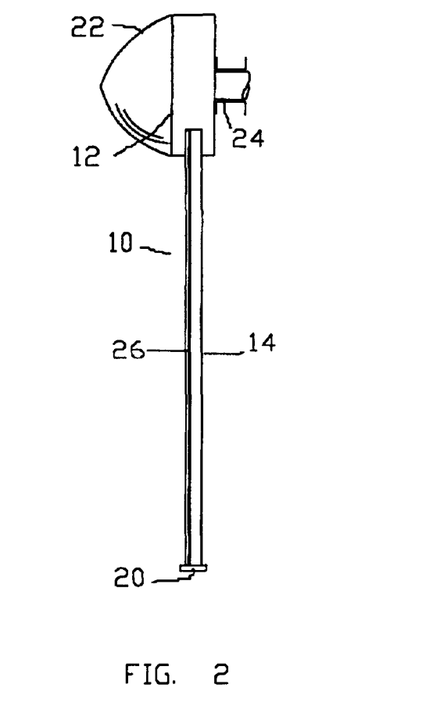
FIG. 2 is a side elevational view of the airfoils of FIG. 1.

Referring now to FIGS. 1 and 2 of the drawing, a propeller, shown generally at 10 comprises a hub 12 and blade 14. Blade 14 is one of a plurality of blades, which could number from two to six or more. Only such blade 14 is shown in FIG. 1, it being understood that the actual number of blades, numbering two to six would be circumferentially spaced around the hub 12 in a conventional fashion.

Blade 14 extends in a generally radial direction from hub 12 and rotates in a direction indicated by arrow 16 about an axis 18 of hub 12 in a plane of rotation. The tip of each blade is provided with a fin attached to the blade tip to block radial flow of air longitudinally along the blade.

Referring to FIG. 2, the propeller is conventionally supplied with a fairing cone 22 and is rotatably mounted on a shaft in bearings as depicted schematically at 24.

In accordance with the present invention a funnel strip 26 is mounted above the top (suction side) of the airfoil and adapted to create a funnel-shaped passage designated to increase the velocity of air flowing over the suction side of the airfoil.

Figure 3:
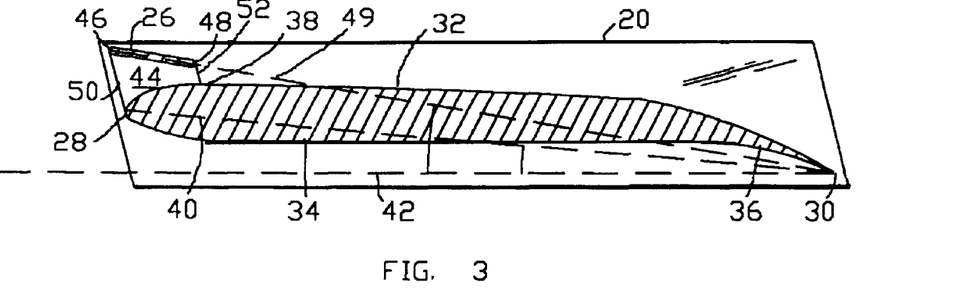
FIG. 3 is an enlarged cross-sectional view of a single blade of the airfoil taken along lines III—III of FIG. 1.

Referring to FIG. 3 of the drawing, the enlarged cross-sectional view of the funneled rotary foil shows an airfoil cross section designed as a supercritical airfoil. The airfoil includes a leading edge 28, a trailing edge 30, a suction side 32, a pressure side 34, and a downwardly angled cusp 36 near the trailing edge. The thickness of the cross section increases from leading edge 28 to a maximum thickness at point 38 on the suction side, and then decreases very gradually with a nearly flat surface for 70% of its length, before curving down to form a cusp 36. The method of design of such a supercritical airfoil cross section is well known to those skilled in the art. The chord of the airfoil is shown at 40 as a line extending between the leading and trailing edges of the blade. The airfoil is deployed on the hub to form an angle of attack α between line 40 and the plane of rotation of the blade, which is indicated by line 42.

In accordance with the invention of Ser. No. 09/682,455, the funnel strip 26 is mounted and attached to the blade 14 to run the entire length thereof from the hub 12 to the fin 20. Additional supporting struts 44 may be spaced longitudinally along the propeller blade to hold the funnel strip 26 in the position shown in FIG. 3. Funnel strip 26 is a substantially flat plate as shown in FIG. 3 with an inlet edge 46 and an outlet edge 48. A line 49 from the trailing edge 30 of the airfoil to the inlet edge 46 of the funnel strip forms a larger funnel angle β with the plane of rotation 42.

Funnel strip 26 is oriented with respect to the chord 40 of the airfoil and, as seen from the drawing, functions as a funnel to scoop air in at an inlet 50 to an outlet 52 as the blade rotates in the plane of rotation. The funnel passage from inlet 50 to outlet 52 is bounded at the blade tip by fin 20 and at the blade root by the hub 12.

The dimensions and location of funnel strip 26 are such that the ratio of total area of the inlet 50 divided by the total area of the outlet 52 lies in a range between 2 to 1 and 20 to 1. In the embodiment shown in FIG. 3, this ratio of inlet area to outlet area is 4 to 1, the angle of attack α is 5°, and the funnel angle β is 10°. These parameters are only exemplary of a range of values, which vary with the design. Angle α may vary from 3° to 7° while angle β varies respectively from 8° to 12° for a given blade and funnel geometry.

Airflow through a funnel can increase the velocity of the air as much as twenty fold with little loss of energy. Aerodynamically: $area_1 \times velocity_1 = area_2 \times velocity_2$ minus drag due to friction. Hence the theoretical air velocity over the top, almost flat, suction side 32 of blade 14 in the arrangement shown in FIG. 3 is four times that of the conventional air velocity. Hence, the theoretical lift is sixteen times as great minus the losses due to drag. Since the blade is designed or oriented for the highest L/D, a greatly improved thrust to the propelled device is the result of the funnel strip attached to the blade.

While the fluid motors of the present invention may use any type of conventional impeller, such as a propeller, designed to produce thrust along an axis of rotation when rotated, the preferable impeller used in the present invention is the previously described funneled rotary foil, and the invention will be described in its preferred form as utilizing a funneled rotary foil.

Secondary Fluid Motor

Figure 4:
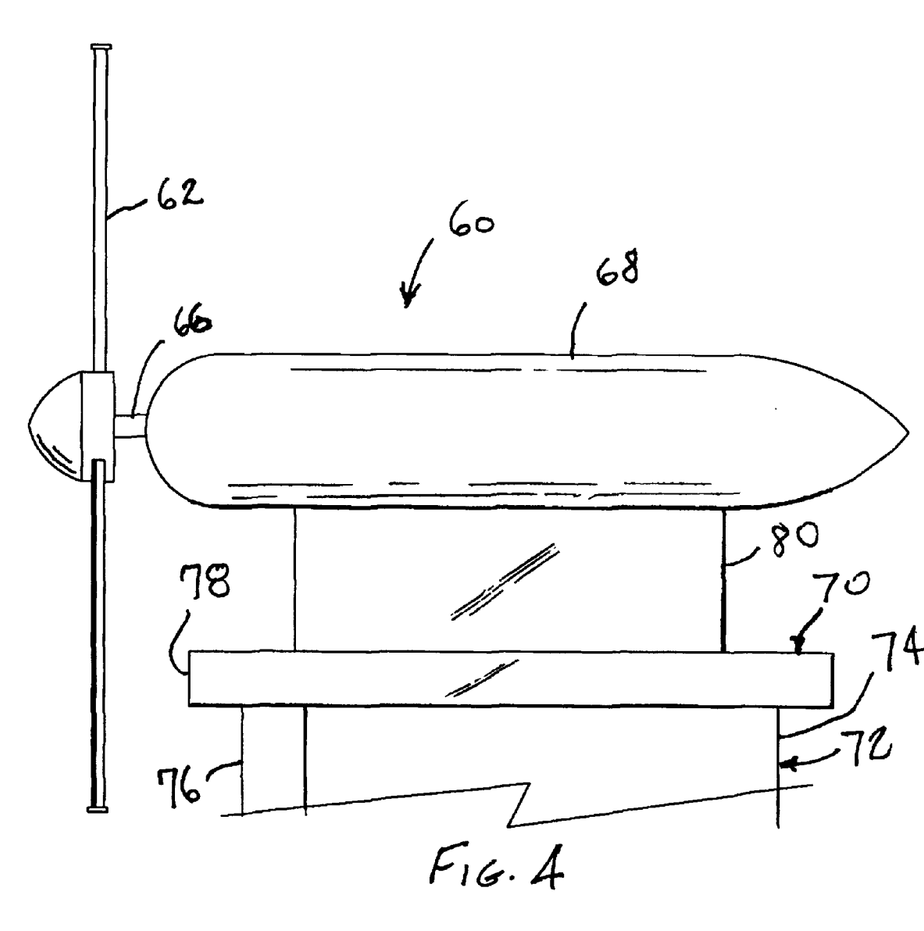
FIG. 4 is a side elevational view of a secondary fluid motor with a funneled rotary foil impeller.
Figure 5:
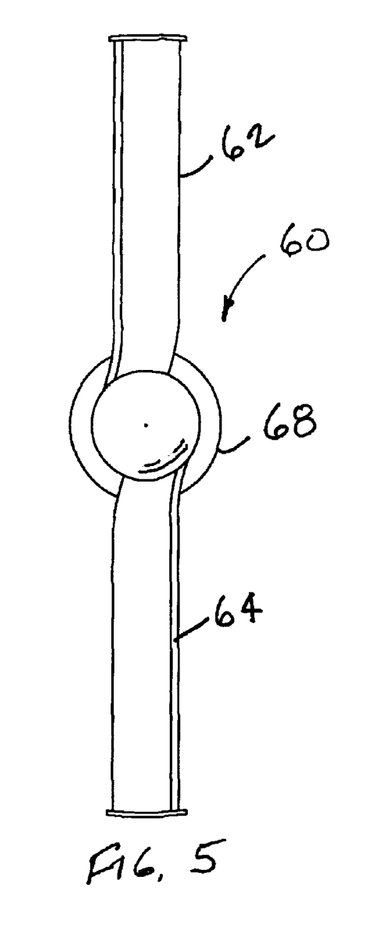
FIG. 5 is a front elevational view of the secondary fluid motor of FIG. 4.

The present invention utilizes secondary fluid motors to drive a primary fluid motor. A secondary fluid motor in its preferred form will first be described. Referring to FIGS. 4 and 5 of the drawing, a secondary fluid motor, shown generally at 60, comprises a two-bladed secondary impeller 62 constructed as a funneled rotary foil by adding a funnel strip 64 to accelerate fluid, such as air, over the suction side of the blade. The impeller 62 is rotated around a secondary axis of rotation on a shaft 66. A secondary drive motor 68 is connected to a power source (not shown) to rotate the secondary impeller blades. The drive motor 68 is mounted on a peripheral portion 70 of a primary drive member shown generally at 72.

In the preferred form shown in FIG. 4, the primary drive member 72 is also constructed as a funneled rotary foil 74, having a funnel strip 76 and a fin 78 for preventing radial flow as previously described in connection with FIGS. 1–3. The secondary drive motor 68 is mounted on fin 78 with a secondary support member 80. Drive 68 may be electric, hydraulic, or pneumatic, having a self-contained power source, or powered by an external source through electrical connections or conduits (not shown) extending through the funneled rotary foil 74.

Primary Fluid Motor

Figure 6:
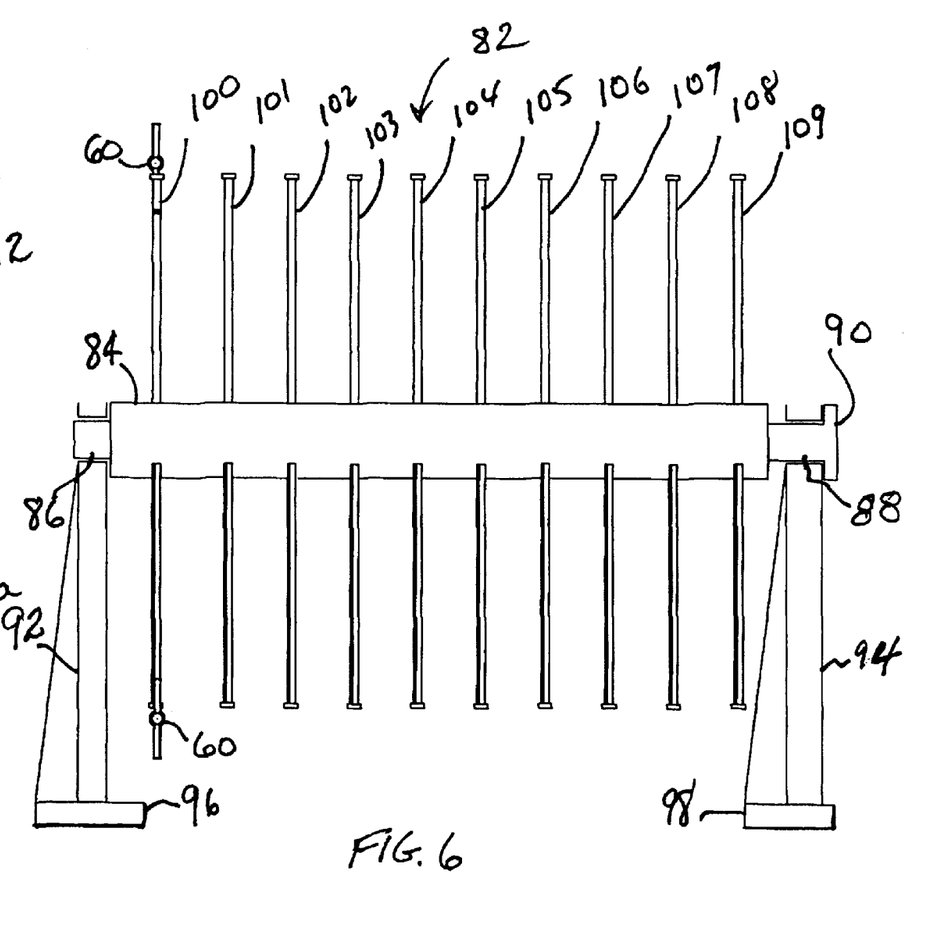
FIG. 6 is a side elevational view of a primary fluid motor constructed in accordance with the present invention.

Referring now to FIG. 6 of the drawing, one form of primary fluid motor is shown generally at 82. A cylindrical hub 84, is rotatably mounted on journals 86, 88 at opposite ends thereof, and includes a thrust plate 90. A primary support includes legs 92, 94 resting on base members 96, 98. The support legs at either end may be arranged in pairs for stability, as indicated at 92a, b.

Mounted on hub 84 are axially spaced identical primary fluid impellers constructed as funneled rotary foils 100–109. These are shown as two-bladed impellers, but they could also contain a larger number of blades. Mounted on the tip of each of the blades of primary impeller 100 is a secondary fluid motor 60, constructed as previously described in FIGS. 4 and 5. The secondary fluid motors 60 are directed in opposite directions so that the thrust created by the secondary impellers 62 generates a cumulative rotational torque causing the primary fluid impellers to rotate. As the primary impellers 101–109 rotate, they create thrust along the primary axis of rotation, which is absorbed by thrust plate 90 and translated to support base members 96, 98.

The combination of the primary fluid motor together with the secondary fluid motors arranged to provide the rotational torque to turn the primary fluid motor comprises fluid motor apparatus for amplifying thrust. The fluid motor apparatus may thereby provide propulsive thrust for a vehicle, aircraft or act as a fluid motor to produce propulsive power for other devices as known to those skilled in the art.

Modification of Primary Fluid Motor

Figure 8:
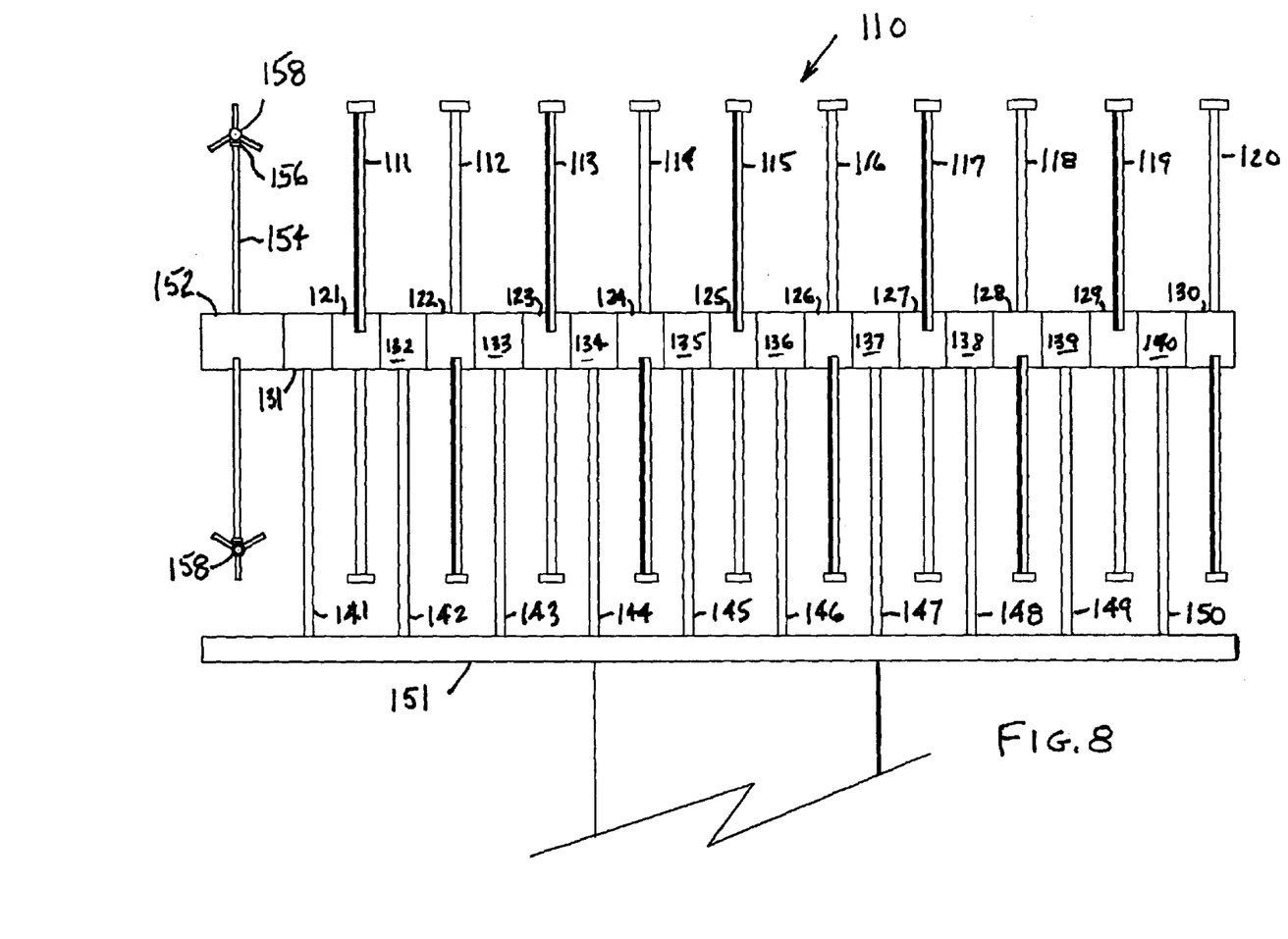
FIG. 8 is a side elevational view of another type of primary fluid motor constructed in accordance with the present invention.
Figure 9:
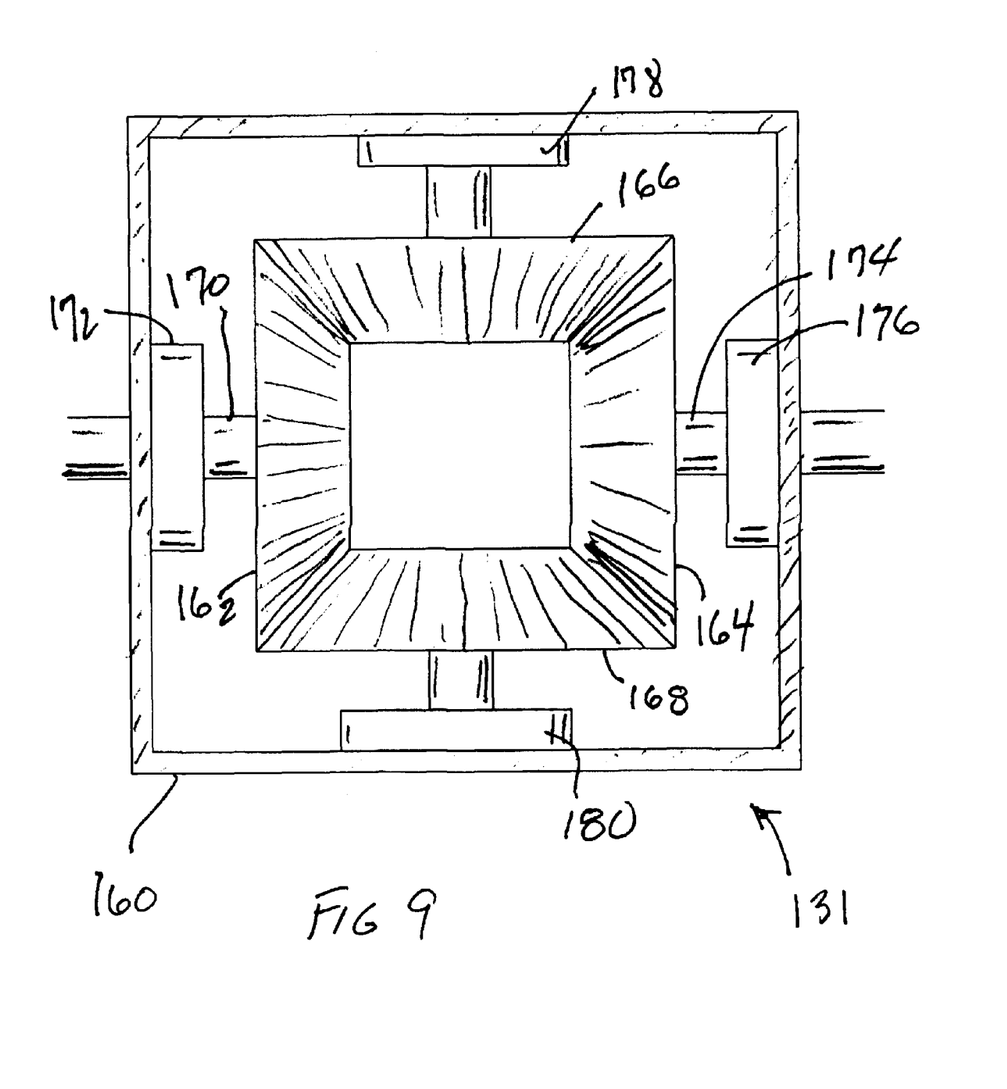
FIG. 9 is a cross-sectional view of a counter-rotation gear box used in the primary fluid motor of FIG. 8.

Referring now to FIGS. 8 and 9, a second modification of a primary fluid motor is shown generally at 110. Ten counter-rotating impellers indicated by reference members 111–120 are disposed to rotate about a primary axis of rotation on rotatable hubs 121–130, respectively. Disposed adjacent and between the hubs are stationary counter-rotational gear boxes 131–140 supported on struts 141–150, respectively. The struts 141–150, together with a base member 151, comprise a primary support member for rotatably supporting primary fluid impellers 111–120.

Adjacent the first stationary gear box 131 is a rotatable hub 152 supporting a primary drive member 154. The primary drive member 154 may consist of radial members or a disc having peripheral portions 156. Primary drive member 154 may also be constructed as a funneled rotary foil, so that it performs a dual function, but that is not necessary. Mounted on the peripheral portions 156 of the primary drive member 154 are secondary fluid motors 158. These are preferably constructed with funneled rotary foil impellers, as previously described.

Referring to FIG. 9 of the drawing, one of the counter-rotational gear boxes 131–140 is shown, these being identical and commercially available items. Gear box 131 is shown in cross-section to include a casing 160 housing four beveled gears. A drive gear 162 and a drive gear 164 both mesh with an idler gear 166 and an idler gear 168. Drive gear 162 is connected to a drive shaft 170 and a bearing 172, and drive gear 164 is similarly connected to a drive shaft 174 and a bearing 176. Idler gears 166, 68 are disposed to rotate freely in bearings 178, 180 respectively. Counter-rotation of shafts 170 and 174 is provided by gear box 131. Shafts 170, 174 are connected to the hubs on either side of gear box 131 to cause the hubs to rotate along with the impellers in opposite directions. The other gear boxes 132–140 may be identical in construction.

Referring back to FIG. 8, the secondary fluid motors 158 are directed in opposite directions to provide rotational torque to primary member 154. Rotational torque is transmitted via the gear boxes 131–140 to cause impellers 111, 113, 115, 117, 119 to rotate in one direction and impellers 112, 114, 116, 118 and 120 to rotate in the opposite direction. Thrust is thereby generated by the primary fluid motor, which is transmitted via struts 140–150 to base member 151. The combination of the modified primary fluid motor with counter-rotating impellers and driven by secondary fluid motors is a modified fluid motor apparatus for amplifying thrust.

Generator Powered by Fluid Motor Apparatus

Figure 10:
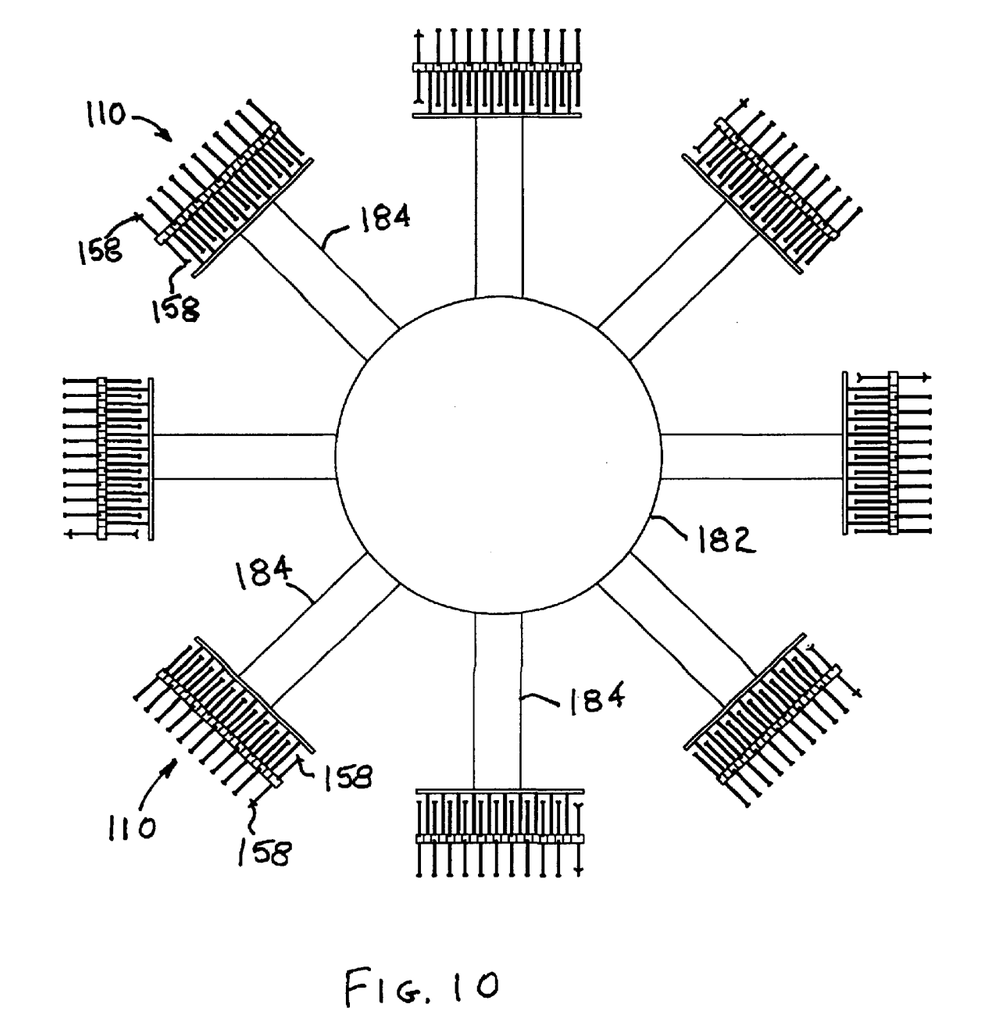
FIG. 10 is a top plan view of an application of the primary fluid motor of FIG. 8, shown driving a generator.

FIG. 10 illustrates an application of the amplified fluid motor apparatus. A series of previously described primary fluid motors 110 driven by secondary fluid motors 158 are circumferentially spaced around the rotor of an electric generator, shown in top view at reference numeral 182. The generator rotor is connected to radial struts 184, which, in turn, are connected to the base members 151 of the primary fluid motors 110. The primary motors 110 are arranged such that the thrust generated along the primary axis of rotation is perpendicular to the struts 184. This converts the thrust to rotary motion, thereby generating power to turn the rotor of generator 182.

Figure 7:
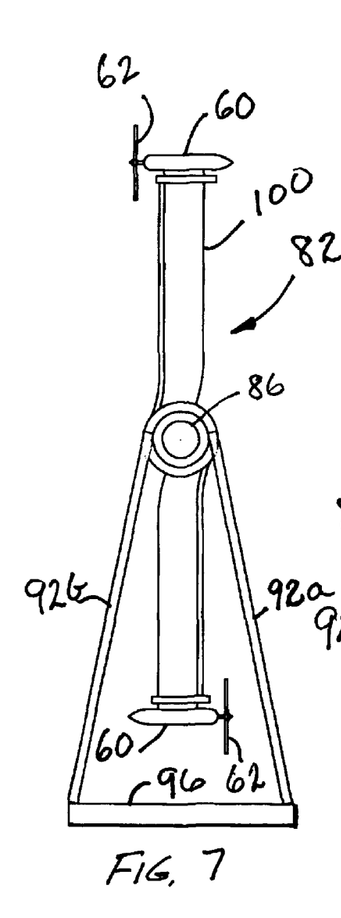
FIG. 7 is a front elevational view of the primary fluid motor of FIG. 6.

While the fluid motor apparatus shown in FIGS. 8 and 9 was used to drive the generator of FIG. 10, the fluid motor of FIGS. 6 and 7 could also be used.

Modified Impeller

Figure 11:
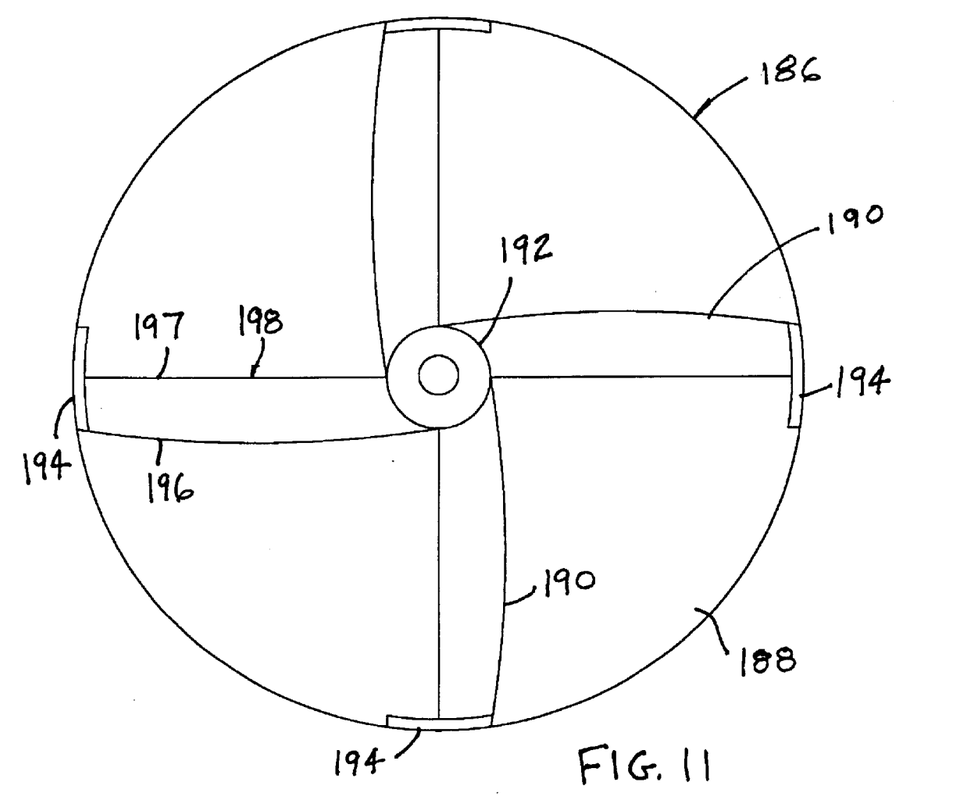
FIG. 11 is top plan view of a modified form of thrust-producing impeller.
Figure 12:
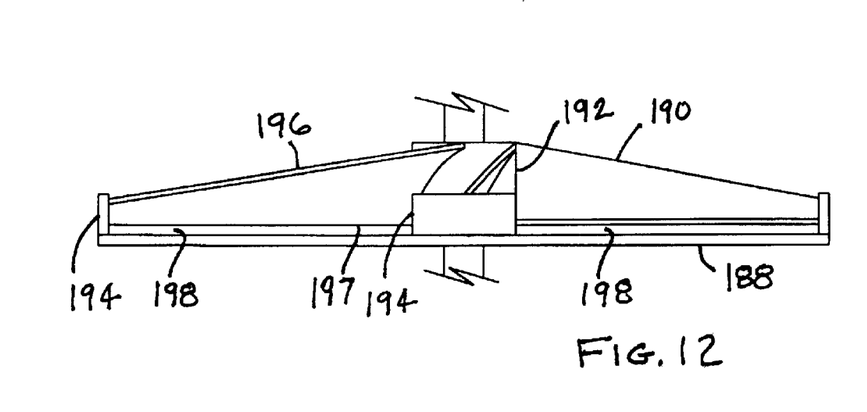
FIG. 12 is a side elevational view of the impeller of FIG. 11.

Referring to FIGS. 11 and 12 of the drawings, a modified impeller 186 is disclosed. Also developing thrust by accelerating fluid over the suction side of a surface, a rotatable disc 188 is provided with funnel strips 190, all rotatably mounted on a hub 192. Funnel strips 190 are flat plates supported by the hub 192 on the inner ends thereof and by peripheral arcuate fins 194 on the outer ends. Each of the funnel strips has an inlet edge 196 and an outlet edge 197. The outlet edges are uniformly spaced from the disc to create an outlet 198 of uniform width bounded by hub 192 and fin 194. The inlet edges 196 are variably spaced from the disc, so as to create an inlet which varies in the funnel angle from the hub to the fin. Air is scooped into the funnel at the inlet created by funnel strip 190 and exits from the outlet 198 on the suction side of the disc 188. The acceleration imparted to the air on one side of disc 188 creates thrust in the manner previously described. A modified impeller constructed as described is referred to herein as a funneled rotary disc. side of the disc 188. The acceleration imparted to the air on one side of disc 188 creates thrust in the manner previously described. A modified impeller constructed as described is referred to herein as a funneled rotary disc.

Operation and Advantages

It is assumed that both the primary fluid motor and the secondary fluid motors use a funneled rotary foil (FRF), a highly efficient, propeller-like device capable of producing a lift-to-drag (L/D) ratio of 100/1, The combination of secondary fluid motors rotating a primary fluid motor allows the thrust from the FRF's to be amplified to give a coefficient of performance (COP) of 1000/1.

Referring to FIGS. 7 and 8, and based on the above assumptions, the theoretical performance is as follows:

1. The primary fluid motor 82 is rotating and is powered by two secondary fluid motors 60.

2. The two motors 60 each require 0.5 lb. of resistance to overcome the drag.

3. For the total of 1 lb. of drag they generate a total of 100 lbs. of thrust (lift).

4. The 100 lbs. of lift from the secondary fluid motors 60 overcome the resistance of the primary fluid motor 82. They overcome the drag of the first FRF 100 and the stack of FRF's 101–109 behind it. 100 lbs. of such drag can provide 10,000 lbs. of lift at a right angle.

5. This is summarized as follows: Total drag on the two motors 60=1 lb. Total lift on the motors 60=100 lbs. This converts the drag on the primary motor 82 to 10,000 lbs. total lift (thrust) on the base 62 by means of the amplifying effect of the combined fluid motors.

While the description relates to an idealized schematic, it appears that a coefficient of performance (COP) of 10 to 10,000 seems feasible. It teaches that use of the lift from a small FRF (or propeller) to overcome the drag on a highly efficient FRF (or propeller) can greatly amplify the lift or thrust of the total system. Note that the distance covered by the secondary fluid motors is the same as that covered by the primary fluid motors as they rotate. Aerodynamics allows a small force to generate a large force at a right angle to it. Work=force×distance. A small force at a right angle× distance can equal a much larger force traveling the same distance at the same time.

The impellers of the secondary fluid motors may need to be partially or fully enclosed to maximize their lift or to greatly reduce the drag when rotating against an air stream flowing at an angle to it. They could be covered with an egg-like, streamlined enclosure. Sufficient air may need to enter and leave to produce a high L/D; many variations are possible. The immediate design would utilize a series of FRF's in a stack attached to the central shaft. This would be suitable for a larger area use such as an electricity-generating plant. For mobile uses or residential uses, a more compact form of combined unit of primary and secondary fluid motors would be desired.

In the aerodynamic formula, lift increases linearly with increased gas density. Use of a higher density gas increases lift; also use of an enclosure to house a higher density gas or to enclose compressed air or to utilize a compressed, higher density gas is a possibility.

The fluid motors used in the present invention use known techniques like adjusting the angle of attack from positive to negative to reverse, brake or for steering. Use of one or more fluid motors per vehicle or plane or boat should allow their use for the propulsion of trucks, planes, tanks, rockets, boats, machinery, etc.

Other propulsion systems would also be feasible, such as a type of helicopter that allows one or more fluid motors to provide vertical, or when tilted, angular lift, plus another horizontal propulsion unit both for forward and backward propulsion.

Other applications include an electricity generator in a range of power outputs, construction equipment motors, and a central generator for a series of electric motors. The secondary fluid motors powering the primary fluid motor could be driven by the electricity generator attached to the primary fluid motor.

SUMMARY

In essence this patent application is for a fluid motor apparatus providing an amplified thrust from a regular propeller or preferably from a rotary funneled foil. The amplifying propellers or rotary funneled foils of the primary fluid motor are larger than the propeller or most preferably the funneled rotary foil of the secondary fluid motors.

A propeller produces possibly 10 times more thrust than air resistance, while a funneled rotary airfoil produces about 100 times more thrust than air resistance in lbs. Both would travel a similar distance, which reduces the efficiency of the propeller to 15 25%, while the rotary funneled foil has an efficiency approaching 100%. Each overcomes the drag or air resistance of a much bigger propeller (or FRF) while traveling the same distance as the larger propeller (or FRF) per unit time. Therefore, 1 lb. of drag on a small propeller (or FRF), produces 10 to 100 lbs. of thrust, which overcomes the drag of the larger propeller (or FRF), allowing it to produce 10×10=100 to 100×100=10,000 lbs. of thrust theoretically, but less in real life. For practical purposes a set of several large propellers or FRF's attached to the same shaft or set of shafts on the primary fluid motor would be needed.

While preferred embodiments of the invention have been described with modifications, it is desired to include all modifications that fall within the scope of the invention.

What is claimed is:

1. A fluid motor comprising:

a primary fluid motor comprising a plurality of primary rotating fluid impellers axially spaced along a primary axis and arranged to provide cumulative thrust along the primary axis, a plurality of secondary fluid motors each having at least one secondary rotating fluid impeller arranged to generate thrust along a secondary axis, secondary drive means adapted to cause the secondary fluid impellers to rotate, said secondary fluid motors being disposed on the primary fluid motor with their respective secondary axes directed with respect to the primary axis to cause the primary fluid impeller to rotate about the primary axis, whereby thrust along the primary axis is generated by said secondary drive means.

2. The fluid motor according to claim 1, including a plurality of counter-rotating gear boxes disposed along said primary axis between said spaced primary fluid impellers and arranged to rotate alternating primary impellers in opposite rotational directions.

3. A fluid motor comprising:

a primary fluid motor having at least one primary rotating fluid impeller arranged to generate thrust along a primary axis wherein the primary fluid impellers are constructed as funneled rotary foils, a plurality of secondary fluid motors each having at least one secondary rotating fluid impeller arranged to generate thrust along a secondary axis, secondary drive means adapted to cause the secondary fluid impellers to rotate, said secondary fluid motors being disposed on the primary fluid motor with their respective secondary axes directed with respect to the primary axis to cause the primary fluid impeller to rotate about the primary axis, whereby thrust along the primary axis is generated by said secondary drive means.

4. A fluid motor comprising:

a primary fluid motor having at least one primary rotating fluid impeller arranged to generate thrust along a primary axis wherein the primary rotating fluid impeller is constructed as a funneled rotary disc, a plurality of secondary fluid motors each having at least one secondary rotating fluid impeller arranged to generate thrust along a secondary axis, secondary drive means adapted to cause the secondary fluid impellers to rotate, said secondary fluid motors being disposed on the primary fluid motor with their respective secondary axes directed with respect to the primary axis to cause the primary fluid impeller to rotate about the primary axis, whereby thrust along the primary axis is generated by said secondary drive means.

5. A fluid motor comprising:

a primary fluid motor having at least one primary rotating fluid impeller arranged to generate thrust along a primary axis, a plurality of secondary fluid motors each having at least one secondary rotating fluid impeller arranged to generate thrust along a secondary axis wherein the secondary rotating fluid impeller is constructed as a funneled rotary foil, secondary drive means adapted to cause the secondary fluid impellers to rotate, said secondary fluid motors being disposed on the primary fluid motor with their respective secondary axes directed with respect to the primary axis to cause the primary fluid impeller to rotate about the primary axis, whereby thrust along the primary axis is generated by said secondary drive means.

6. A fluid motor comprising:

a primary fluid motor having at least one primary rotating fluid impeller arranged to generate thrust along a primary axis, a plurality of secondary fluid motors each having at least one secondary rotating fluid impeller arranged to generate thrust along a secondary axis wherein the secondary rotating fluid impellers are constructed as funneled rotary discs, secondary drive means adapted to cause the secondary fluid impellers to rotate, said secondary fluid motors being disposed on the primary fluid motor with their respective secondary axes directed with respect to the primary axis to cause the primary fluid impeller to rotate about the primary axis, whereby thrust along the primary axis is generated by said secondary drive means.

7. A fluid motor comprising:

a primary fluid motor having at least one primary drive member rotatably mounted to rotate in a plane of rotation along a primary axis of rotation, said primary drive member having peripheral portions spaced from said primary axis of rotation, at least one primary fluid impeller connected to be rotated by said primary drive member, said primary fluid impeller being arranged to receive a fluid and provide thrust along said primary axis of rotation, a primary support rotatably mounting said primary drive member and said primary fluid impeller, a plurality of secondary fluid motors, each of said secondary fluid motors having a rotatably mounted secondary fluid impeller arranged to provide thrust along a secondary axis of rotation when rotated, secondary drive means adapted to cause the secondary fluid impellers to rotate and provide thrust, and secondary support means mounting the secondary fluid motors on said peripheral portions of the primary drive member with the secondary axes of rotation arranged so that the secondary fluid motors direct their thrust to cause the primary drive member to rotate around the primary axis.

8. The fluid motor according to claim 7, wherein said secondary fluid motors are disposed on said primary rotating fluid impeller.

9. The fluid motor according to claim 7, wherein the primary fluid impellers are constructed as funneled rotary foils.

10. The fluid motor according to claim 7, wherein the primary fluid impellers are constructed as propellers.

11. The fluid motor according to claim 7, wherein the primary fluid impellers are constructed as funneled rotary discs.

12. The fluid motor according to claim 7, wherein the secondary fluid impellers are constructed as funneled rotary foils.

13. The fluid motor according to claim 7, wherein the secondary fluid impellers are constructed as propellers.

14. The fluid motor according to claim 7, wherein the secondary fluid impellers are constructed as funneled rotary discs.

15. The fluid motor according to claim 7, wherein said primary fluid motor comprises a plurality of primary fluid impellers axially spaced along said primary axis of rotation, and arranged to provide cumulative thrust along the primary axis.

16. The fluid motor according to claim 15, including a plurality of counter-rotational gear boxes disposed along said primary axis between said spaced primary fluid impellers and arranged to rotate alternating primary impellers in opposite rotational directions.

17. A fluid motor comprising:

a primary fluid motor having at least one primary drive member rotatably mounted to rotate in a plane of rotation along a primary axis of rotation, said primary drive member having peripheral portions spaced from said primary axis of rotation, at least one primary fluid impeller comprising a funneled rotary foil connected to be rotated by said primary drive member, said primary fluid impeller being arranged to receive a fluid and provide thrust along said primary axis of rotation, a primary support rotatably mounting said primary drive member and said primary fluid impeller, a plurality of secondary fluid motors, each of said secondary fluid motors having a rotatably mounted secondary fluid impeller comprising a funneled rotary foil arranged to provide thrust along a secondary axis of rotation when rotated, secondary drive means adapted to cause the secondary fluid impellers to rotate and provide thrust, and secondary support means mounting the secondary fluid motors on said peripheral portions of the primary drive member with the secondary axes of rotation arranged so that the secondary fluid motors direct their thrust to cause the primary drive member to rotate around the primary axis.

18. The fluid motor according to claim 17, wherein said secondary fluid motors are disposed on said primary rotating fluid impeller.

19. The fluid motor according to claim 17, wherein said primary fluid motor comprises a plurality of primary fluid impellers axially spaced along said primary axis of rotation, and arranged to provide cumulative thrust along the primary axis.

20. The fluid motor according to claim 19, including a plurality of counter-rotational gear boxes disposed along said primary axis between said spaced primary fluid impellers and arranged to rotate alternating primary impellers in opposite rotational directions.

21. The combination of:

a power generator having a rotor, a plurality of struts extending radially from said rotor, and a fluid motor disposed on each of said struts, each of said fluid motors comprising:
- a primary fluid motor having at least one primary rotating fluid impeller arranged to generate thrust along a primary axis perpendicular to a respective strut,
- a plurality of secondary fluid motors each having at least one secondary rotating fluid impeller arranged to generate thrust along a secondary axis,
- secondary drive means adapted to cause the secondary.fluid impellers to rotate,
- said secondary fluid motors being disposed on the primary fluid motor with their respective secondary axes directed with respect to the primary axis to cause the primary fluid impeller to rotate about the primary axis, whereby thrust along the primary axis is generated by said secondary drive means and converted to rotary motion by the struts to turn the rotor of the power generator.

* * * * *